United States Patent
Vereen et al.

(10) Patent No.: US 7,287,175 B2
(45) Date of Patent: Oct. 23, 2007

(54) OPTICAL NETWORK TERMINAL WITH LOW-POWER SLEEP LOGIC THAT SUBSTANTIALLY EXTENDS THE LIFE OF THE BATTERY AFTER THE AC MAIN POWER SUPPLY HAS BEEN LOST

(75) Inventors: Jerry Darden Vereen, Coral Springs, FL (US); Ronald Howard Diego, Boca Raton, FL (US); Barry Alan Farber, Coral Springs, FL (US)

(73) Assignee: Tellabs Petaluma, Inc., Petaluma, CA (US)

( * ) Notice: Subject to any disclaimer, the term of this patent is extended or adjusted under 35 U.S.C. 154(b) by 442 days.

(21) Appl. No.: 10/894,770

(22) Filed: Jul. 19, 2004

(65) Prior Publication Data

US 2006/0053309 A1   Mar. 9, 2006

(51) Int. Cl.
*G06F 1/00* (2006.01)
*G06F 1/26* (2006.01)
*G06F 1/32* (2006.01)

(52) U.S. Cl. .................. 713/323; 713/300; 713/320

(58) Field of Classification Search ............. None
See application file for complete search history.

(56) References Cited

U.S. PATENT DOCUMENTS

| 6,016,548 | A  | * | 1/2000 | Nakamura et al. ......... 713/323 |
| 6,378,068 | B1 | * | 4/2002 | Foster et al. ............... 713/1 |
| 6,883,102 | B2 | * | 4/2005 | Williams et al. ........... 713/300 |
| 7,028,194 | B2 | * | 4/2006 | Forbes et al. .............. 713/300 |

OTHER PUBLICATIONS

Compaq, Intel, Microsoft, Phoenix, Toshiba, Advanced Configuration and Power Interface Specification, Jul. 27, 2000, Revision 2.0.*

* cited by examiner

*Primary Examiner*—James K. Trujillo
*Assistant Examiner*—Anand B. Patel
(74) *Attorney, Agent, or Firm*—Mark C. Pickering

(57) ABSTRACT

An optical network terminal includes a sleep logic circuit that assumes responsibility for monitoring off-hook transitions after the AC main power supply has failed for a predetermined period of time. The sleep logic circuit is very low power and, as a result, allows the optical network terminal to remain active and provide lifeline support for a much greater period of time.

41 Claims, 5 Drawing Sheets

OPTICAL NETWORK TERMINAL WITH LOW-POWER SLEEP LOGIC THAT SUBSTANTIALLY EXTENDS THE LIFE OF THE BATTERY AFTER THE AC MAIN POWER SUPPLY HAS BEEN LOST

BACKGROUND OF THE INVENTION

1. Field of the Invention

The present invention relates to an optical network terminal (ONT) and, more particularly, to an ONT with low-power sleep logic that substantially extends the life of the battery after the AC main power supply has been lost.

2. Description of the Related Art

The subscriber end of a Fiber-To-The-Home (FTTH) network terminates a fiber optic cable in an optical network terminal (ONT) positioned at an interior or exterior location on a subscriber's premise. As a result, a substantial amount of bandwidth can be made available to the subscriber to provide a variety of services, such as plain old telephone service (POTS), Internet access (data) service, and video service.

One of the requirements of a POTS provider is to insure that, after the AC main power has failed, telephone service, known as lifeline telephone service, is continuously available for a period of time, such as eight hours. In an FTTH network, this is accomplished by providing a battery backup (BBU), such as an uninterruptible power supply, at the subscriber's premise. Thus, when power is lost, the BBU at the subscriber's premise provides power to the ONT at the subscriber's premise to maintain the lifeline telephone service for the required period of time.

FIG. 1 shows a block diagram that illustrates a prior-art FTTH network 100. As shown in FIG. 1, FTTH network 100 includes an optical line terminal (OLT) 102, a subscriber 104, a battery backup (BBU) 106, and an ONT 108 that is connected to OLT 102, subscriber 104, and BBU 106.

ONT 108 passes data signals and telephone signals between OLT 102 and subscriber 104, and transmits a video signal from OLT 102 to subscriber 104. For example, in the upstream pathway, ONT 108 receives a video signal, a data signal, and a voice signal from OLT 102; and transmits the video signal, the data signal, and the voice signal to subscriber 104 when power from an AC main power source is present. In this case, ONT 108 consumes a first amount of power when ONT 108 simultaneously transmits the video signal, the data signal, and the voice signal.

As further shown in FIG. 1, ONT 108 includes a microprocessor 110 that controls the operation of ONT 108 when the AC main power source has been lost. In addition to microprocessor 110, ONT 108 also includes a triplexer 112 (an optical transceiver that is connected to a fiber to carry an upstream wavelength, a down stream wavelength, and a video overlay wavelength) that is connected to a fiber optic cable. Further, ONT 108 includes a flash memory 114, a RAM memory 116, a clock driver 118, an I2C 120, a media access controller 122, and a voltage converter 124. These devices, along with microprocessor 110 and triplexer 112, constitute the core logic devices of ONT 108.

To provide telephone service, ONT 108 also includes a number of, such as four, subscriber line interface circuits (SLICs) 130, which each provide interfaces to the phone lines of the subscribers, and a subscriber line audio-processing circuit (SLAC) 132, which provides an interface between the SLICs 130 and triplexer 112. ONT 108 additionally includes a 10/100 physical layer circuit 134, a dual RS232 converter 136, a phase locked loop 140, and a number of LEDs 142.

Further, ONT 108 includes a power supply that includes a first power supply 150 that outputs first and second voltages, such as 3.3V and 5.0V, a second power supply 152 that outputs a third voltage, such as 12V, and a third power supply 154 that outputs fourth and fifth voltages, such as −30V and −90V. First, second, and third power supplies 150, 152, and 154 supply power from the AC main power supply when the AC main power supply is available, and from backup battery 106 when the AC main power supply is no longer available.

As shown, each of the above devices (except for the other power supplies), is connected to the first power supply 150 to receive the first voltage (3.3V). In addition, the triplexer 112 and a 12V external source 166 are connected to the second power supply 152 to receive the third voltage (12V). Further, the SLICs 130 are also connected to the first power supply 150 to receive the second voltage (5V). The SLICs 130 are additionally connected to the third power supply 154 to receive the fourth and fifth voltages (−30V and −90V).

In operation, microprocessor 110 continuously monitors an AC main power supply, and checks a battery power status indicator that is output from BBU 106. The battery status indicator can indicate, for example, whether the power supply or the battery module is providing the power, whether or not the battery in BBU 106 is charged or needs charging, and whether or not the battery in BBU 106 needs replacing.

When a loss of power from the AC main power source is detected, microprocessor 110 reports the lost power condition to OLT 102, and stops the transmission of the video signal. In addition, BBU 106 provides power (when the battery power status indicator indicates that BBU 106 is charged and has the power to provide). In this case, ONT 108 consumes a second amount of power when ONT 108 simultaneously transmits the data signal and the voice signal without the video signal. The second amount of power, in turn, is less than the first amount of power, thereby saving power.

Further, after the AC main power source has been lost for a predetermined period of time, microprocessor 110 stops the transmission of the data signal. In this case, ONT 100 consumes a third amount of power when ONT 108 only transmits the voice signal. The third amount of power, in turn, is less than the second amount of power, thereby saving additional power.

When the power provided by BBU 106 reaches a failure threshold (or when the power from the power supply reaches a failure threshold when BBU 106 has previously failed or is unavailable), microprocessor 110 detects this condition, known as a last gasp condition, and reports the condition to OLT 102.

During the last gasp condition, microprocessor 110 utilizes a charge stored in ONT 108 to allow microprocessor 110 to execute a controlled shut down. The charge, in turn, can be stored on a capacitor to provide a finite amount of energy. (ONT 108 can be implemented without a last gasp circuit.)

Once both power supplies have failed, ONT 108 shuts down, and does not turn on again until one of the two power supplies have returned. Throughout the time that power from the AC main power source is present, and during the time that power is supplied by BBU 106 (until the power from BBU 106 fails), microprocessor 110 detects off hook transitions that occur when subscriber 104 wishes to initiate a telephone call.

In the present example, ONT 108 provides lifeline support (detects off hook conditions while on battery power) for approximately eight hours. Although eight hours is a reasonable period of time, it is desirable to be able to provide lifeline support for a much longer period of time, such as twice as much or more.

SUMMARY OF THE INVENTION

The present invention provides a system and method of significantly extending an amount of time that battery power is available to an optical network terminal (ONT) after the AC main power has failed. The ONT of the present invention receives a video signal, a data signal, and a voice signal from an optical line terminal; and transmits the video signal, the data signal, and the voice signal to a subscriber when power from an external power source is present. The ONT consumes a first amount of power when the ONT simultaneously transmits the video signal, the data signal, and the voice signal.

In the present invention, the ONT includes a processor that continuously monitors the external power source, and checks a power status indicator from a battery power source. Further, the processor detects a loss of power from the external power source, and enters the battery mode from the normal mode and stops a transmission of the video signal after detecting the loss of power from the external power source. The ONT consumes a second amount of power when the ONT simultaneously transmits the data signal and the voice signal. The second amount of power is less than the first amount of power.

In addition, the processor stops a transmission of the data signal while in the battery mode after the external power source has been lost for a first predetermined period of time. The ONT consumes a third amount of power when the ONT only transmits the voice signal. The third amount of power is less than the second amount of power. Further, the processor detects off hook transitions when power from the external power source is present, and during the first predetermined period of time.

The present invention additionally includes a method of extending an amount of time that battery power is available to an optical network terminal (ONT) that receives a video signal, a data signal, and a voice signal from an optical line terminal; and transmits the video signal, the data signal, and the voice signal to a subscriber when power from a first power source is present. The ONT consumes a first amount of power when the video signal, the data signal, and the voice signal, are simultaneously transmitted.

The method further includes the steps of continuously monitoring the first power source, and checking a power status indicator from a second power source. Further, the method includes the steps of detecting a loss of power from the first power source, and providing power in response.

In addition, the method includes the step of stopping a transmission of the video signal when the first power source is detected as lost. The ONT consumes a second amount of power when simultaneously transmitting the data signal and the voice signal, and the video signal is turned off. The second amount of power is less than the first amount of power.

In addition, the method includes the step of stopping a transmission of the data signal after the first power source has been detected as lost for a first predetermined period of time. The ONT consumes a third amount of power when transmitting only the voice signal. The third amount of power is less than the second amount of power. The method further includes the step of detecting off hook transitions when power from the first power source is present, and during the first predetermined period of time.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
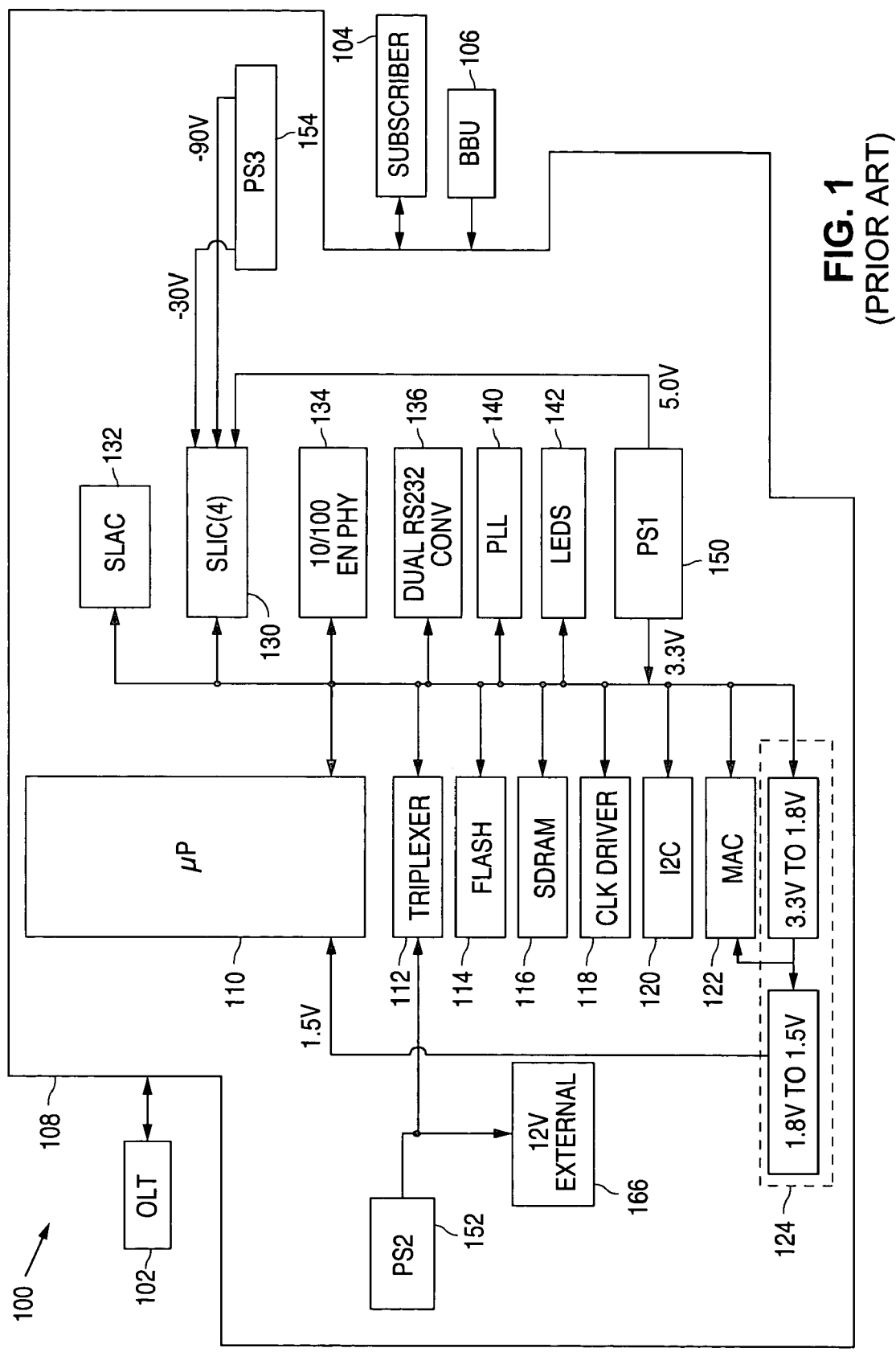
FIG. 1 is a block diagram illustrating a prior-art FTTH network 100.
Figure 2A:
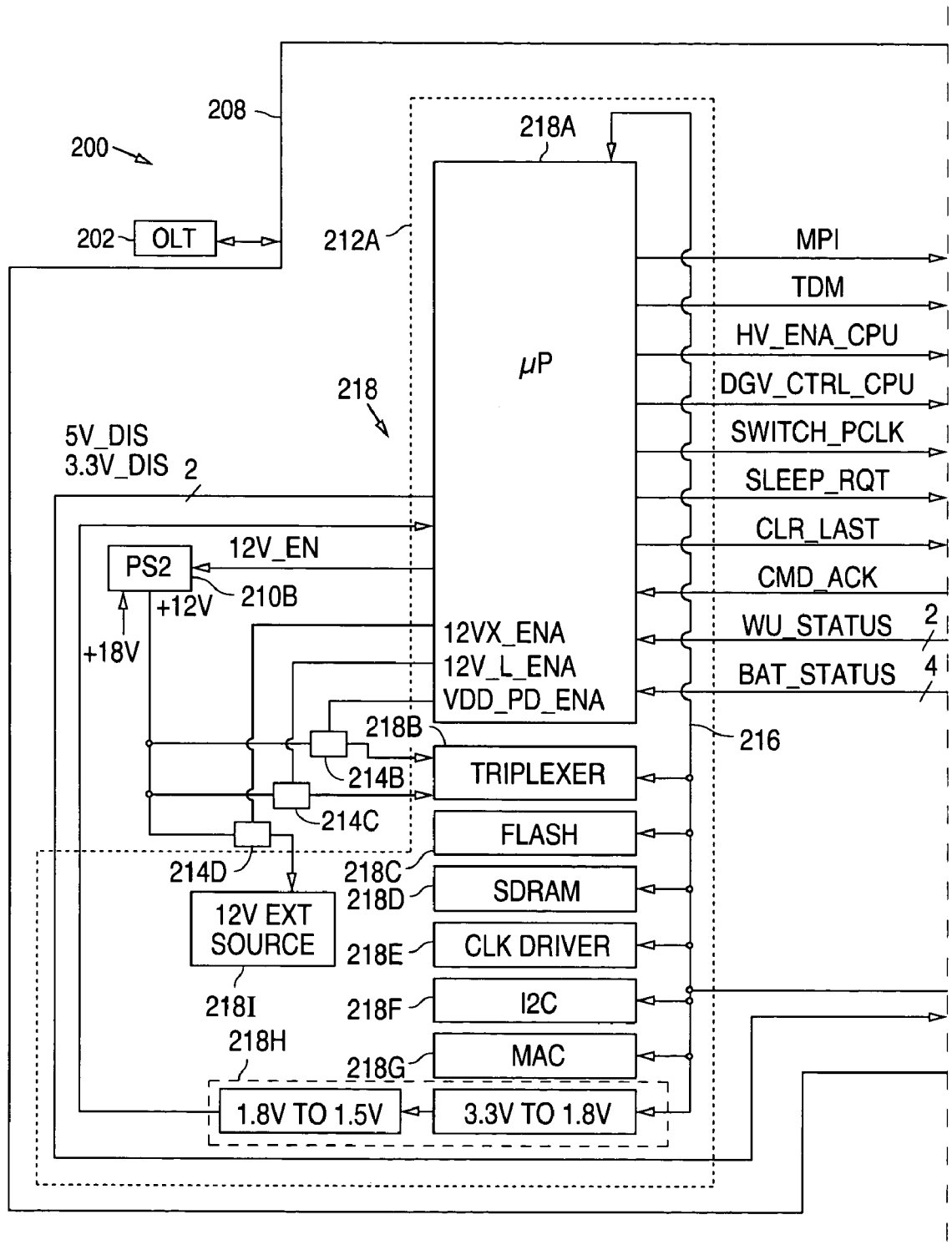
FIGS. 2A-2B are a block diagram illustrating a network 200 in accordance with the present invention.
Figure 2B:
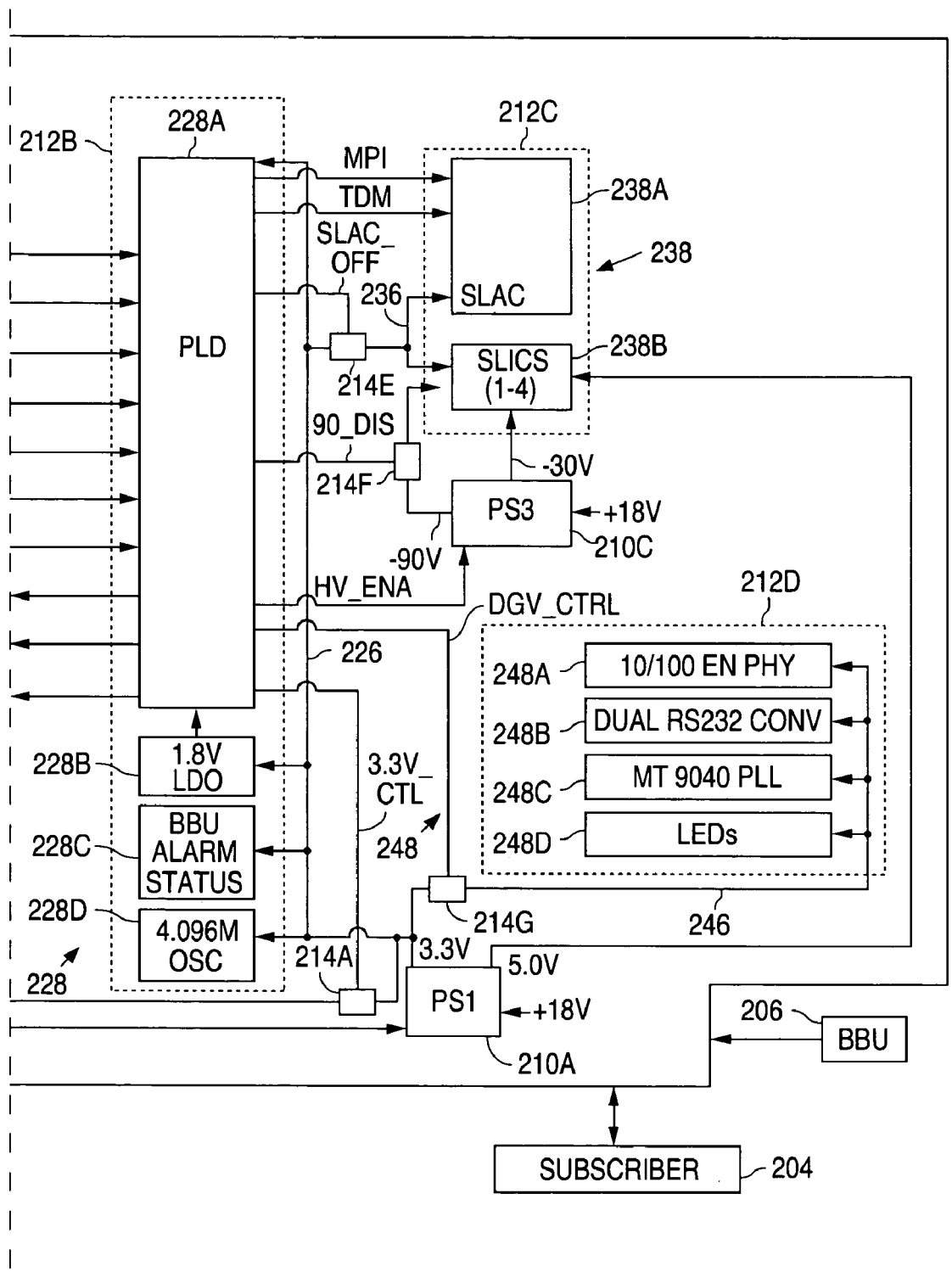

FIGS. 2A-2B show a block diagram that illustrates a network 200 in accordance with the present invention. As described in greater detail below, network 200 includes an optical network terminal (ONT) which has a sleep logic circuit that assumes responsibility for monitoring off-hook transitions after the AC main power supply has been lost for a period of time. The sleep logic circuit is very low power, and thus significantly extends the lifetime of the battery, and thereby the amount of time that the ONT can provide lifeline telephone service (service after the AC main power has been lost).

As shown in FIGS. 2A-2B, network 200 includes an optical line terminal (OLT) 202, a subscriber 204, a battery backup (BBU) 206, and an ONT 208 that is connected to OLT 202, subscriber 204, and BBU 206. ONT 208 passes data signals and telephone signals between OLT 202 and subscriber 204, and transmits a video signal from OLT 202 to subscriber 204.

For example, in the upstream pathway, ONT 208 receives a video signal, a data signal, and a voice signal from OLT 202; and transmits the video signal, the data signal, and the voice signal to subscriber 204 when power from an AC main power source is present. In this case, ONT 208 consumes a first amount of power when ONT 208 simultaneously transmits the video signal, the data signal, and the voice signal to subscriber 204.

Further, ONT 208 includes a power supply that includes a first power supply 210A that receives +18V, down converts the voltage, and outputs first and second voltages, such as 3.3V and 5.0V, and a second power supply 210B that receives +18V, down converts the voltage, and outputs a third voltage, such as 12V.

In addition, the power supply also includes a third power supply 210C that receives +18V, down converts the voltage, and outputs fourth and fifth voltages, such as −30V and −90V. First, second, and third power supplies 210A, 210B, and 210C supply power from the AC main power supply when the AC main power supply is available, and from backup battery 206 when the AC main power supply is no longer available.

As further shown in FIGS. 2A-2B, ONT 200 also includes a number of power circuits 212 that consume power performing ONT functions, and a number of power switches 214 that control power to the power circuits 212. The power circuits 212 include a first power circuit 212A that includes the core logic of ONT 200, a second power circuit 212B that includes the circuits that continuously receive power until power is no longer available, a third power circuit 212C that includes the POTS connections, and a fourth power circuit 212D that includes the data connections.

As further shown in FIGS. 2A-2B, first power circuit 212A includes a power line 216, and a number of core logic circuits 218 that are connected to power line 216. Power line 216, in turn, is connected to the 3.3V output of the first power supply 210A via a first power switch 214A.

In the FIGS. 2A-2B example, power switch 214A is controlled by a control signal 3.3V_CTL that turns on power switch 214A when the voltage of the control signal 3.3V_CTL is low (ground), and turns off power switch 214A when the voltage of the control signal 3.3V_CTL is high. When power switch 214A is turned off, power is removed from the core logic circuits. Power is removed from the core logic circuits 218 only when ONT 200 enters a sleep mode of operation.

The core logic circuits 218 of first power circuit 212A can include, for example, a microprocessor 218A, a triplexer 218B (an optical transceiver that is connected to a fiber to OLT 202 to carry an upstream wavelength, a down stream wavelength, and a video overlay wavelength), a flash memory 218C, a RAM memory 218D, a clock driver 218E, an I2C 218F, a media access controller 218G, and a voltage converter 218H.

Microprocessor 218A outputs control signals to the first power supply 210A that include the control signals 5V_DIS and 3.3V_DIS, and a control signal 12V_EN that is output to second power supply 210B. The control signal 5V_DIS removes the 5V power supply, and the control signal 12V_EN removes the 12V power supply, when ONT 200 is in the dying gasp mode. The control signal 3.3V_DIS removes the 3.3V power supply (the 3.3V power supply is always on during normal operation, including the dying gasp and sleep modes).

In addition, a second power switch 214B and a third power switch 214C are connected to triplexer 218B and the +12V output of second power supply 210B, and a fourth power switch 214D is connected to a 12V external circuit 218I and the +12V output of second power supply 210B.

Power switch 214B is controlled by a control signal VDD_PD_ENA, and power switch 214C is controlled by a control signal 12V-L-ENA, both output by microprocessor 218A. Power switches 214B and 214C turn on when the voltages of the control signals VDD_PD_ENA and 12V-L-ENA are high, and turn off when the voltages of the control signals VDD_PD_ENA and 12V-L-ENA are low (ground). When power switches 214B and 214C are turned off, +12V is removed from triplexer 218B.

Further, power switch 214D is controlled by a control signal 12VX_ENA output by microprocessor 218A. Power switch 214D turns on when the voltage of the control signal 12VX_ENA is high, and turns off when the voltage of the control signal 12VX_ENA is low (ground). When power switch 214D is turned off, +12V is removed from a 12V external circuit 218I.

The control signals are by default deasserted and remain deasserted even when microprocessor 218A is turned off. If not already turned off, microprocessor 218A turns off the +12V connections with these control signals before entering the sleep mode, and turns them on as needed after awakening from the sleep mode.

Referring again to FIGS. 2A-2B, second power circuit 212B includes a power line 226 and a number of sleep-mode circuits 228 that are connected to power line 226. Power line 226 is connected to power supply 210A. Unlike the first power circuit 212A, the second power circuit 212B is always connected to the 3.3V output of power supply 210A.

The sleep-mode circuits 228, which represent the low power devices of the ONT, can include a sleep mode programmable logic device (PLD) 228A, a low drop out voltage regulator 228B, a battery back up (BBU) alarm status circuit 228C, and an oscillator 228D. As shown, PLD 228A outputs a control signal HV_ENA to power supply 210C to enable and disable the −30V and −90V sources.

Referring again to FIGS. 2A-2B, third power circuit 212C includes a power line 236, and a number of circuits 238 that are connected to power line 236. The circuits 238 include, for example, the 3.3V connections to a subscriber line audio-processing circuit (SLAC)/quad codec 238A, and the 3.3V connections to, for example, four subscriber line interface circuits (SLICs) 238B. The SLICs 238B are the circuits that form a POTS interface to subscriber 204, while SLAC 238A provides an interface between microprocessor 218A and the SLICs 238B.

Power line 236 is connected to a fifth power switch 214E which, in turn, is connected to power line 226. In the example shown in FIGS. 2A-2B, power switch 214E is controlled by a control signal SLAC_OFF from PLD 228A. Power switch 214E turns off when the voltage of the control signal SLAC_OFF is high, and turns on when the voltage of the control signal SLAC_OFF is low (ground). When power switch 214E is turned off, 3.3V is removed from SLAC 238A and the SLICs 238B. Power is removed from SLAC 238A and the SLICs 238B in the third power circuit 212C only when ONT 200 enters the dying gasp mode of operation.

In addition, in the example shown in FIGS. 2A-2B, the SLICs 238B are also connected to the first power supply 210A to receive the third voltage (5V), and the third power supply 210C to receive the fourth voltage (−30V). Further, the SLICs 238B are connected to the third power supply 210C via a sixth power switch 214F to receive the fifth voltage (−90V).

Power switch 214F is controlled by a control signal 90_DIS output from PLD 228A. Power switch 214F turns off when the voltage of the control signal 90_DIS is high, and turns on when the voltage of the control signal 90_DIS is low (ground). When power switch 214F is turned off, −90V is removed from the SLICs 238B. Power is removed from the SLICs 238B in the third power circuit 212C when ONT 200 enters the dying gasp mode of operation, and when in the sleep mode of operation. In addition, even more power is saved by forcing the SLICs 238B to use −30V in the sleep mode of operation. This is the minimum needed to detect off-hook transitions.

As further shown in FIGS. 2A-2B, microprocessor 218A and PLD 228A exchange a number of control signals. In the example shown in FIGS. 2A-2B, microprocessor 218A outputs microprocessor interface (MPI) and time division multiplexing (TDM) signals when microprocessor 218A is not in the sleep mode.

PLD 228A passes the MPI and TDM signals onto SLAC 238A and the SLICs 238B when microprocessor 218A is not in the sleep mode. On the other hand, when microprocessor 218A is in the sleep mode, PLD 228A generates and outputs the MPI signals (as necessary) and the timing signals TDM. In the present invention, to further save power, PLD 228A generates the timing signals TDM (the clock signal PCLK and the framing signal) at the lowest frequency that is usable by SLAC 238A and the SLICs 238B.

For example, PLD 228A can generate and output the clock signal PCLK and the framing signal at approximately ¼ the frequency of the clock and framing signals output by microprocessor 218A. PLD 228A includes multiplexers that pass the MPI and TDM signals from microprocessor 218A when microprocessor 218A is not in the sleep mode, and passes the MPI and TDM signals from PLD 228A when microprocessor 218A is in the sleep mode.

The MPI signals control the operation of SLAC 238A which, in turn, controls each POTS port via the SLICs 238B. The TDM signals control the timing of, and the transfer of data through, the SLICs 238B. The TDM signals include timing signals, such as a TDM clock signal (PCLK) and a frame synch signal, and data signals, such as transmit and receive data signals, i.e., the PCM highway.

Microprocessor 218A also outputs the signals HV_EN-A_CPU, DGV_CTRL_CPU, SWITCH_PCLK, SLEEP_RQT, and CLR_LAST. PLD 228A outputs the signals CMD_ACK, WU_STATUS(2), and BAT_STATUS(4). Whenever microprocessor 218A enters the sleep mode, PLD 228A places a high impedance (tristate) on each line that is connected to microprocessor 218A.

Microprocessor 218A receives battery status information from the battery status signals BAT_STATUS output by PLD 228A. The battery status signals BAT_STATUS can include, for example, a low battery signal, a replace battery signal, and a missing battery signal. PLD 228A, in turn, receives the battery status information from battery back up (BBU) 206, and passes the battery status information to microprocessor 218A via the battery status signals BAT_STATUS when microprocessor 218A is not in the sleep mode. On the other hand, PLD 228A responds to the battery status signals BAT_STATUS when microprocessor 218A is in the sleep mode.

Referring again to FIGS. 2A-2B, fourth power circuit 212D includes a power line 246, and a number of circuits 248 that are connected to power line 246. The circuits 248 include, for example, a 10/100 physical layer circuit 248A, a dual RS232 converter 248B, a phase locked loop 248C, and a number of LEDs 248D.

Power line 246 is connected to power supply 210A via a seventh power switch 214G. In the example shown in FIGS. 2A-2B, power switch 214G is controlled by a control signal DGV_CTL output from PLD 228A. Power switch 214G turns off when the voltage of the control signal DGV_CTL is high, and turns on when the voltage of the control signal DGV_CTL is low (ground). When power switch 214G is turned off, power is removed from the fourth power circuit 212D. Power is removed from the fourth power circuit 212D only when ONT 200 enters a sleep mode of operation or the dying gasp mode of operation.

Figure 3:
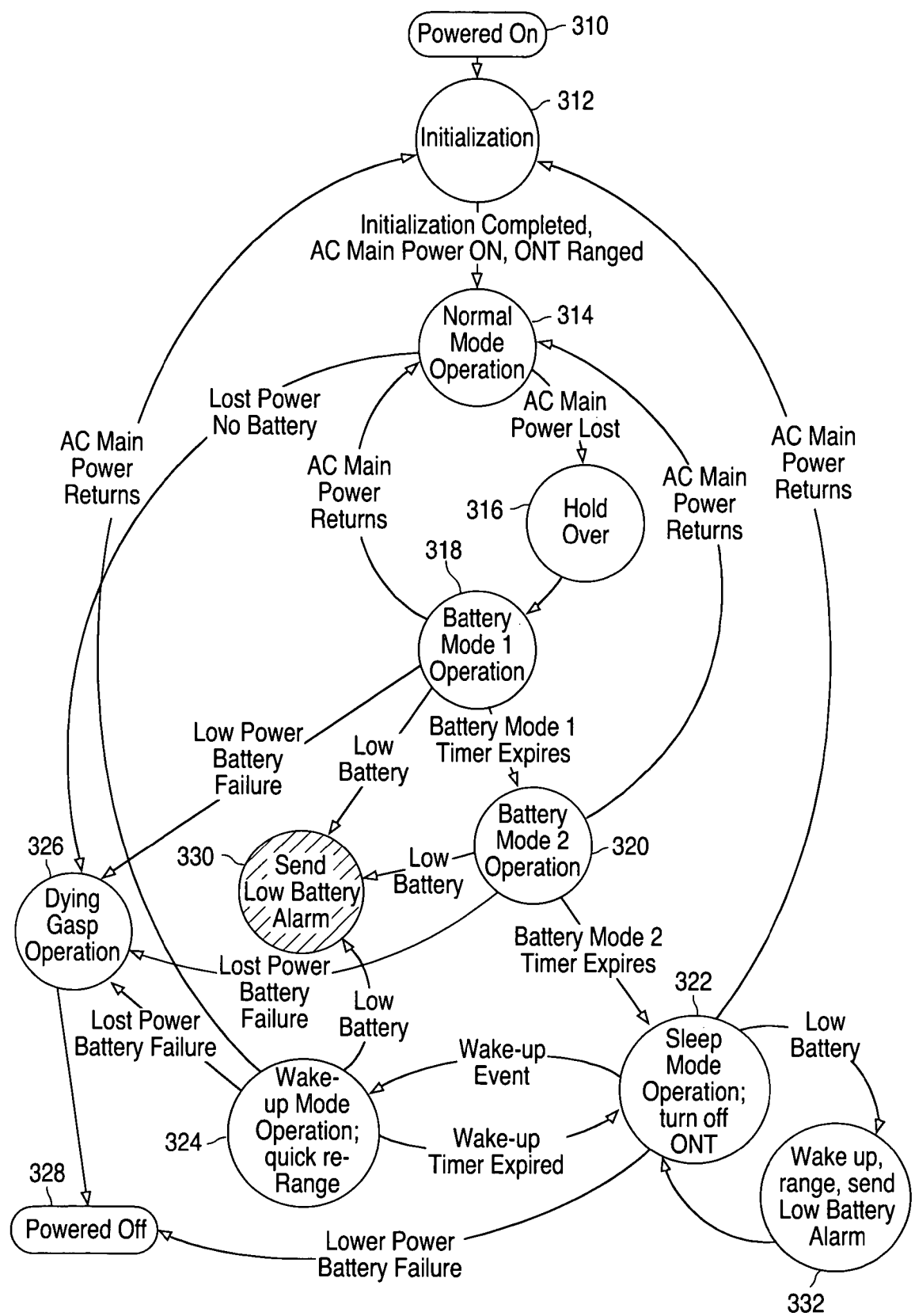
FIG. 3 is a state diagram illustrating the operation of an ONT 300 in accordance with the present invention.

FIG. 3 shows a state diagram that illustrates the operation of an ONT 300 in accordance with the present invention. ONT 300 can be implemented with ONT 208 and, as a result, the operation of ONT 300 is discussed with reference to the structures of network 200.

As shown in FIG. 3, ONT 300 begins by leaving an off state and moving to state 310 where the AC main power is applied, and then moving to state 312 where ONT 300 follows a first initialization sequence. The first initialization sequence includes checking the status of a sleep mode flag stored in a register in flash memory 218C to determine if ONT 300 is powering up from the off state or a sleep mode. When ONT 300 powers up from the off state, initialization can also include, for example, a test of DRAM 218D.

Further, the first initialization sequence also includes the steps of loading information into the various registers to enter a ranging state where microprocessor 218A waits to be polled by optical line terminal (OLT) 202 and, once polled by OLT 202, outputs the information necessary to establish a connection between OLT 202 and microprocessor 218A.

Once the connection between OLT 202 and microprocessor 218A has been established, the first initialization sequence is complete and ONT 300 moves to state 314, referred to as the Normal Mode Operation State, where the AC main power is present. In this state, when the AC main power is present, POTS, data (internet), and video services can all be provided to subscriber 204.

When in the Normal Mode Operation State 314, processor 218A continuously monitors the battery status signals BAT_STATUS output from PLD 228A (which are input to PLD 228 from BBU 206 as battery status signals). When the AC main power is lost, processor 218A detects the condition of the battery via the battery status signals BAT_STATUS.

In addition, the battery supply also detects the loss of AC main power and, when detected and battery power is available, outputs battery power in lieu of the AC main power. In this case, ONT 300 moves to state 316, referred to as the Hold Over State, where full power is maintained by the battery for a hold over period of time, such as 30 seconds, to cover the case where the AC main power failure is just a short glitch. (The Hold Over State is optional. ONT 300 can optionally move directly to state 318.)

If the AC main power returns before a hold over timer expires, ONT 300 returns to the Normal Mode Operation State 314. On the other hand, if the AC main power remains off at the end of the hold over period, ONT 300 moves to step 318, referred to as the Battery Mode 1 Operation State, where microprocessor 218A disables (stops the transmission of) the video services, such as by disabling the CATV and RF-Adaptor, and outputs an AC Fail Alarm to OLT 202.

The time spent in the Battery Mode 1 Operation State 318 is programmable, and controllable by a battery mode 1 timer. For example, the battery mode 1 timer can be set to run from 5 minutes to 60 minutes in 5 minute increments with a 15 minute default. If the AC main power returns before the battery mode 1 timer expires, ONT 300 returns to the Normal Mode Operation State 314 where the video services are again resumed.

On the other hand, if the battery mode 1 timer expires, ONT 300 moves to state 320, referred to as the Battery Mode 2 Operation State, where microprocessor 218A disables (stops the transmission of) the data services in addition to the previously disabled video services. The time spent in the Battery Mode 2 Operation State 320 is also programmable, and controllable by a battery mode 2 timer. For example, the battery mode 2 timer can be set to run from 15 minutes to 4 hours in 15 minute increments with a 2 hour default.

The Battery Mode 2 Operation State is optional. ONT 300 can alternately stop the transmission of data at the same time that the transmission of video is stopped. Thus, when the video and data services are stopped sequentially at substantially the same time, the time spent in the Battery Mode 1 Operation State can be considered to be essentially zero minutes.

If the AC main power returns before the battery mode 2 timer expires, ONT 300 returns to the Normal Mode Operation State 314 where the data and video services are again resumed. On the other hand, if the battery mode 2 timer expires, ONT 300 moves to state 322, referred to as the Sleep Mode Operation State, where control is transferred to PLD 228A, and power is removed from microprocessor 218A.

The Sleep Mode Operation State is intended to serve as an extended "minimal operational mode" for emergency outbound phone use. As a result, all of the core logic of power circuit 212A, including microprocessor 218A, is powered off during the sleep mode. Inbound calls cannot be received during sleep mode. All other services (data service and video service) are shut down in sleep mode. The goal is to maximize the time that sleep mode can be maintained. SLAC 238A and the SLICs 238B are powered up during the Sleep Mode Operation State 322 although they run at a reduced power state.

Microprocessor 218A, which controls the operation of ONT 300 except when in the Sleep Mode Operation State 322, prepares to enter the sleep mode by storing an 8-bit code in the register of flash memory 218C which represents the sleep mode flag. The sleep mode flag is stored in non-volatile memory so that when microprocessor 218A powers up, microprocessor 218A can determine whether microprocessor 218A is powering up from the off state or the sleep mode.

After this, microprocessor 218A executes a number of commands in preparation for transferring control over to PLD 228A. In the present example, microprocessor 218A places SLAC 238A and SLICs 238B in a low-power standby state, which offers the lowest power consumption while still being able to detect an off-hook transition, and arms the appropriate interrupts for detecting any off-hook transitions as well as any other supervisory mode interrupts that may be required. Microprocessor 218A also disables power supply 210B via the 12V_EN signal.

To save additional power, microprocessor 218A also commands PLD 228A to output the timing signals TDM at a lower frequency by asserting the SWITCH_PCLK command to PLD 228A. In response, PLD 228A acknowledges by toggling the CMD_ACK signal to provide positive acknowledgement to microprocessor 218A that the command was received. The command and acknowledgement handshake ensures that there is no inadvertent entry into undesired states in PLD 228A, perhaps due to a misbehaving microprocessor.

Microprocessor 218A then stops outputting the TDM clock signal and frame synch signal (of the timing signals TDM) to SLAC 238A, while PLD 228A begins generating a TDM clock signal and a frame synch signal at 1.024 MHz and 2 KHz, respectively, without generating glitches (very narrow pulses).

In the present example, SLAC 238A is run at the lowest possible clock rate, which can be, for example, 1.024 MHz. In normal operation, SLAC 238A runs at 4.096 MHz. Therefore, the SLAC DSP is running at ¼ it's normal rate. PLD 228A takes over the responsibility for generating the TDM clock "PCLK" and frame synch "FS" timing signals. A 4.096 MHz oscillator tied to PLD 238A is used to generate the 1.024 MHz PCLK and 2 KHz FS pulse, and to time the PLD internal logic.

Thus, the TDM clock signal generated by PLD 228A has a lower frequency than the TDM clock signal generated by microprocessor 218A such that microprocessor 218A reduces a clock rate to SLAC 238A before entering the sleep mode of operation. The control signals HV_ENA_CPU (high voltage enable CPU) and DGV_CTRL_CPU (dying gasp voltage control CPU) are also related to transferring control to PLD 228A during the sleep mode. Similar command and acknowledgement handshake sequences can be used.

In addition, microprocessor 218A monitors a register, which can generate an interrupt, that includes a clock fail bit CFAIL. The clock fail bit CFAIL will likely activate after the frequency of the timing signals TDM (the TDM clock and framing synch signals) is changed. This interrupt needs to be cleared, along with any other pending interrupts, before microprocessor 218A releases control of monitoring the interrupts over to PLD 228A since PLD 228A will wakeup microprocessor 218A on an interrupt that is supposed to be due to an off-hook transition and not any other cause (except as indicated). Thus, by waiting for the clock fail bit CFAIL to clear before proceeding, microprocessor 218A knows that the TDM clock and framing are good before entering the sleep mode.

Once all of the preparations for entering the sleep mode have been completed, microprocessor 218A then follows a defined handshake sequence to enter the sleep mode. In one embodiment, microprocessor 218A commands PLD 228A to enter the sleep mode by asserting the sleep request signal SLEEP_RQT, while PLD 228A responds by removing power to the core logic by placing a low voltage (ground) on the control signal 3.3V_CTL output to power switch 214A. In another embodiment, microprocessor 218A and PLD 228A can follow a sequence of command signals that insure that the sleep mode is not inadvertently entered.

In addition, when in the sleep mode, PLD 228A places a high voltage on the power switch 214F via control signal 90_DIS, and places a high voltage on the power switch 214G via control signal DGV_CTRL, thereby powering off the circuits controlled by these switches. The control signal 90_DIS removes the −90V from the SLICs 238B to reduce power consumption during the sleep mode.

As noted above, once the core logic has been powered off, PLD 228A places a high impedance (tristate) on each line received from and output to microprocessor 218A. Xilinx offers programmable logic devices, such as Part No. XC2C256-7FT256 of the Coolrunner II Series, that have FETs on the inputs and outputs to fully isolate the connection between microprocessor 218A and PLD 228A.

By placing a high impedance on the lines that are connected to and from microprocessor 218A, microprocessor 218A can be prevented from inadvertently powering up via a voltage on one of its pins, or latching-up if it were to be powered up from the sleep mode of operation with voltage already present on its pins.

During sleep mode, PLD 228A monitors for an off-hook transition (or other abnormal event) on any one of the 4 POTS interfaces, to "eventually" provide an active line to subscriber 204. When an off-hook transition is detected, referred to as a wake-up event, ONT 300 moves to state 324, referred to as the Wake-Up Mode Operation State, where ONT 300 again establishes a connection with OLT 202.

When ONT 300 powers up, microprocessor 218A checks the 8-bit sleep mode flag set in flash memory 218C and, because the sleep mode flag indicates that microprocessor 218A is powering up from the sleep mode, does a fast boot that follows a second initialization sequence that is shorter than the first initialization sequence. The second initialization sequence can exclude, for example, the test of DRAM 218D.

As above, the second initialization sequence can also include the steps of loading information into the various registers to enter the ranging state where microprocessor 218A waits to be polled by optical line terminal (OLT) 202 and, once polled by OLT 202, outputs the information necessary to establish a connection between OLT 202 and microprocessor 218A. Because the second initialization sequence is shorter than the first, microprocessor 218A enters the ranging state in less time in the fast-boot second initialization sequence than in the first initialization sequence.

Once the second initialization sequence is complete, microprocessor 218A reads the control signals WU_STATUS from PLD 228A to see the reason microprocessor 218A is awakening from the sleep mode. There are two status lines for four logical conditions that indicate four possible reasons for waking up from the sleep mode state. Microprocessor 218A uses this status information, along with battery status and local AC status, to determine what to do next.

The four wake up reasons include: 1) the battery has been replaced (the default state upon PLD reset or after receiving a clear sleep status command); 2) a supervisory interrupt (e.g. an off-hook transition) has been received; 3) the AC main power has returned; and 4) the battery has a Low Battery condition.

When wake-up is due to the batteries being replaced, which is different than the battery status replace battery, this condition is detected on power-up by microprocessor 218A seeing the active state of the sleep mode flag in flash memory 218C and also reading the WU_STATUS and seeing that wake-up is not active (0,0). By default this means that power was completely removed while in the sleep state. This would be most likely due to replacing the battery.

When microprocessor 218A detects that the batteries have been replaced, microprocessor 218A immediately takes the steps to re-enter the sleep mode. To re-enter the sleep mode, microprocessor 218A commands PLD 228A to clear the last wakeup status to re-arm PLD 228A for entering the sleep mode the next time. Microprocessor 218A asserts the signal CLR_LAST.

In response, PLD 228A clears the status and toggles the CMD_ACK signal to provide positive acknowledgement to microprocessor 218A that the status was cleared. In addition, microprocessor 218A also places SLAC 238A and the SLICs 238B in the standby mode, transfers TDM clock and frame synch signals to PLD 228A, clears interrupts, clears the sleep mode flag in flash memory 218C, and issues sleep commands to PLD 228A.

When wake-up is due to an off-hook transition, microprocessor 218A commands PLD 228A to switch the TDM timing signals (the clock signal PCLK and the framing signal) back to the core logic control of microprocessor 218A. Microprocessor 218A initializes the SLAC/SLICs and proceeds to determine which channel is off-hook and also take the appropriate steps to playout a message, such as "Please wait for dial tone."

ONT 300 then waits to be ranged by OLT 202 (receive the ranging signal) on the passive optical network (PON). There should be a smooth transition between the playout of the message and the receipt of dial tone. The message can be periodically repeated until a dial tone can be delivered.

During the Sleep Mode Operation State, ONT 300 is not ranged with OLT 202. Only after detecting an off-hook transition does ONT 300 "wake-up" and proceed to range with the OLT. OLT 202 must initiate the ranging process (ONT 300 waits to be polled and then responds), so there will be some delay from the time the subscriber picks up the handset and the time when ONT 300 is ranged. This time will depend on how many ONT's on the PON are down and which ONT is being ranged at the time.

As noted above, while waiting for ranging, an audible message is played out to the subscriber, such as "please wait for dial tone" or the like, as a confirmation that the line will soon be available for use. In addition, "comfort" noise may also be embedded in the "background" to provide the illusion of an active line. This can be particularly heard during breaks in the message and longer pauses when the message is about to repeat. This message and the comfort noise can be played out by microprocessor 218A. Once ONT 300 has been ranged and configured, subscriber 204 receives a dial tone.

When awakened by an off-hook transition, ONT 300 remains in the Wake-Up Mode Operation State 324 for a wake up period of time, such as the length of the phone call plus a remainder time, such as 15 minutes, and then returns to the Sleep Mode Operation State 320. The remainder time is measured by a remainder timer. The hold over timer, the battery mode 1 timer, the battery mode 2 timer, and the remainder timer can be implemented with processor 218A.

To re-enter the sleep mode, microprocessor 218A commands PLD 228A to clear the last wakeup status to re-arm PLD 228A for entering the sleep mode the next time. Microprocessor 218A asserts the signal CLR_LAST. In response, PLD 228A clears the status and toggles the CMD_ACK signal to provide positive acknowledgement to microprocessor 218A that the status was cleared. In addition, microprocessor 218A also places SLAC 238A and the SLICs 238B in the standby mode, transfers TDM clock and frame synch signals to PLD 228A, clears interrupts, clears the sleep mode flag in flash memory 218C, and issues sleep commands to PLD 228A.

If the AC main power returns while ONT 300 is in the Sleep Mode Operation state 322, ONT 300 returns to state 312 where the system is again initialized via the first initialization sequence. Similarly, if the AC main power returns after a call has been completed while ONT 300 is in state 324, ONT 300 returns to state 312 where the system is again initialized.

As shown in FIG. 3, when the AC main power fails while operating in the Normal Mode Operation State 314 and there is no battery power, ONT 300 moves from the Normal Mode Operation State 314 to state 326, referred to as the Dying Gasp Operation State, where a locally charged device, such as a capacitor, provides sufficient power to execute a controlled power down sequence, which ends by moving to state 328, referred to as the Powered Off State. Otherwise, if some battery power is available, ONT 300 moves to the Battery Mode 1 State 318 as described above.

If all of the power sources of ONT 300 run out before the main AC power is returned, ONT 300 moves to Powered Off State 328 to shutdown. If ONT 300 is ranged and in communication with the OLT when the final power loss occurs, a "dying gasp" message will be sent to OLT 202. If ONT 300 is not ranged and in communication with OLT 202 when the final power loss occurs, the dying gasp message will not be sent because there is not enough power available to establish communication with OLT 202 and send the dying gasp message.

Similarly, when the battery power fails while operating in the Battery Mode 1 Operation State 316, ONT 300 moves from the Battery Mode 1 Operation State 318 to the Dying Gasp Operation State 326. When the battery power fails while operating in the Battery Mode 2 Operation State 320, ONT 300 moves from the Battery Mode 2 Operation State 320 to the Dying Gasp Operation State 326.

When the battery power fails while operating in the Wake-Up Mode Operation State 324, ONT 300 moves from Wake-Up Mode Operation State 324 to the Dying Gasp Operation State 326. However, when the battery power fails while operating in the Sleep Mode Operation State 322, ONT 300 moves from Sleep Mode Operation State 322 to the Powered Off Operation State 328, where ONT 300 loses all power.

If battery back up (BBU) 206 asserts the "Low Battery" status while in any battery state, ONT 300 sends a Low Battery alarm to OLT 202. As shown in FIG. 3, when the battery power goes low while operating in the Battery Mode 1 Operation State 318, ONT 300 moves from the Battery Mode 1 Operation State 318 to state 330, referred to as the Send Low Battery Alarm State, where a low battery alarm signal is sent to OLT 202. Following this, ONT 300 moves to the Sleep Mode Operation State 322.

When the battery power goes low while operating in the Battery Mode 2 Operation State 320, ONT 300 moves from the Battery Mode 2 Operation State 320 to the Send Low Battery Alarm State 330 to send the low battery alarm signal to OLT 202. Following this, ONT 300 moves to the Sleep Mode Operation State 322.

When the battery power goes low while operating in the Wake-Up Mode Operation State 324, ONT 300 moves from the Wake-Up Mode Operation State 324 to the Send Low Battery Alarm State 330 to send the low battery alarm signal to OLT 202. Following this, ONT 300 moves to the Sleep Mode Operation State 322.

When the battery power goes low while operating in the Sleep Mode Operation State 322, ONT 300 moves from the Sleep Mode Operation State 322 to state 332, referred to as the Alarm State, where ONT 300 wakes up, is ranged by the PON (establishes a connection with OLT 202 by responding to a poll), sends the low battery alarm signal to OLT 202, and then returns to the Sleep Mode State 322, sending the "I am going to sleep" message.

In addition, the general state of ONT 300 can be determined by visually inspecting ONT 300. For example, ONT 300 can include an AC Power LED that is on steady when operating on AC power, pulses when operating on battery power, such as in states 318, 320, and 324, and is off when operating in states 322 or 328. Similarly, ONT 300 can include a Battery Power LED that is on steady when the battery power is high, and is off when battery power is low.

The operation of ONT 300 is summarized below in Table 1:

TABLE 1

| ONT Power State Table | | |
|---|---|---|
| State | Status | Time in this State |
| Initialization | ONT is powering itself up | 100 ms (not including ranging or ONT/voice gateway provisioning) |
| Normal Operation | All subscribed services operating ONT Power LED on. Battery LED is LIT if BBU is connected and voltage level is good | Indeterminate, depends on external factors, should be a very long time. |
| Hold over | AC Mains power failed, waiting to see if it is really gone | Provisionable from 30 sec to 5 mm in 15 sec increments. Default is 30 sec |
| Battery Operation 1 | ONT Power LED flashing. CATV & RF-Adaptor disabled. | Provisionable from 5 min to 60 min in 5 min increments. Default is 15 min |

TABLE 1-continued

| ONT Power State Table | | |
|---|---|---|
| State | Status | Time in this State |
| | POTS & optics enabled AC Fail alarm sent Battery LED is LIT if BBU is connected and voltage level is good | of POTS & data. |
| Battery Operation 2 | Same as Battery Operation 1 with Ethernet turned off | POTS service only. Provisionable from 15 min to 4 hours in 15 min increments. Default is 2 hours. |
| Sleep | This is the extended AC mains fail mode ONT Power LED is off. Data, CATV, & RF-Adaptor disabled POTS low power monitoring for off-hook Optics disabled Battery LED is LIT if BBU is connected and voltage level is good | Up to 20 hours of operation assuming fourteen 3-minute phone calls during that time. (Each phone 3 minute call causes the ONT to spend 18 minutes in the wakeup state.) |
| Wake up to service an off-hook | ONT Power LED flashing. Data, CATV & RF-Adaptor disabled. Battery LED is LIT if BBU is connected and voltage level is good | Length of phone call plus 15 minutes. |
| Low Battery Operation | Battery voltage is 12 V or less ONT Power LED off. Data, CATV, & RF-Adaptor disabled POTS low power monitoring for off-hook Optics disabled Battery LED is UN-LIT if BBU is connected and voltage level is low | Go to Sleep State after any in progress POTS calls ends plus 15 minutes Talk time is limited to 1.5 hours after this event occurs. |
| Dying Gasp | Dying gasp sent if ONT was ranged when power failed ONT Power LED off. Data, CATV, POTS & RF-Adaptor disabled Optics disabled | 50 ms |

The times listed for how long the ONT stays in a state are approximate, and based upon a new, fully charged battery.

Figure 4:
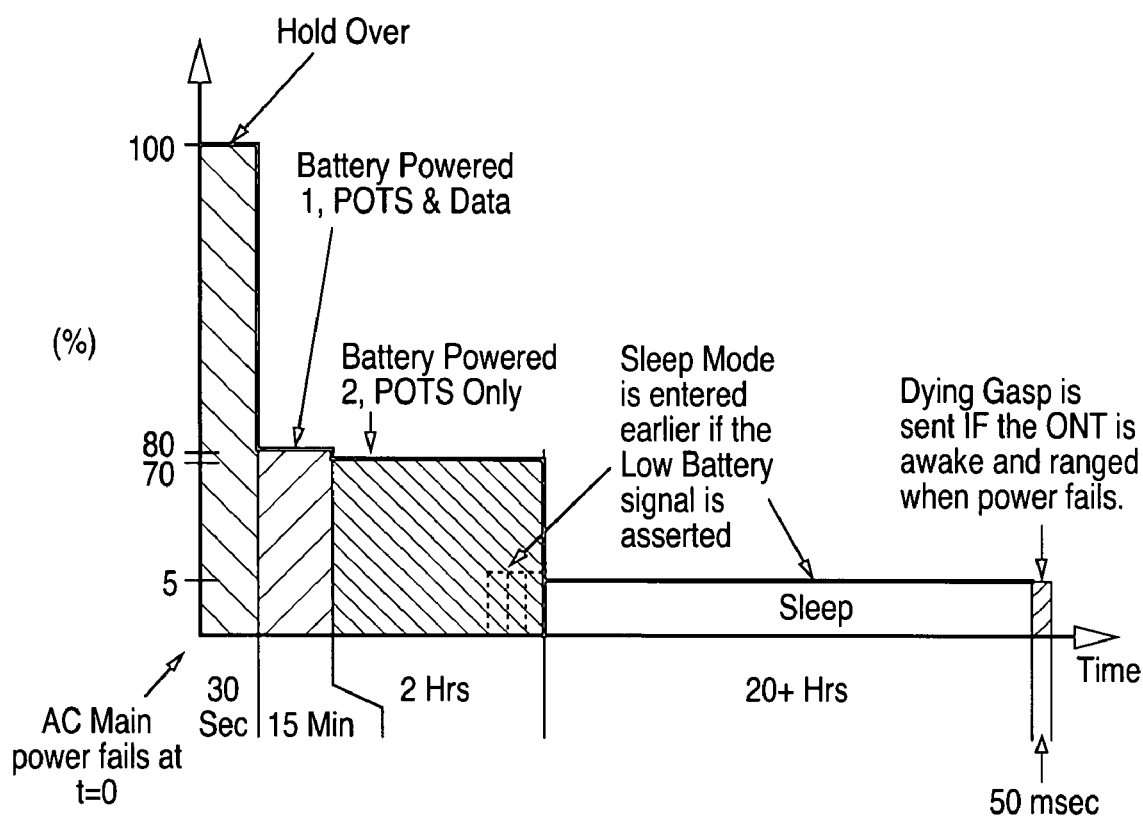
FIG. 4 is a timing diagram illustrating the power consumption of ONT 300 over time in accordance with the present invention.

FIG. 4 shows a timing diagram that illustrates the power consumption of ONT 300 over time in accordance with the present invention. (FIG. 4 does not show the power consumption that results from ONT 300 waking up from the sleep state to service locally originating POTS calls.)

As shown in the FIG. 4 example, once the AC main power fails, ONT 300 moves to the Hold Over State and keeps all applications (POTS, data access and CATV) active at approximately 100% of total power for a holdover period, such as 30 seconds. If the AC main power has not returned by the end of the holdover period, ONT 300 moves to the Battery Operation 1 State for a first battery period, such as 15 minutes. In this state the CATV application and the RF-Adaptor are disabled to reduce power to approximately 80% of total power.

If the main AC power has not returned by the end of the first battery period, ONT 300 moves to the Battery Operation 2 State for a second battery period, such as 2 hours. The Battery Operation 2 State disables the data access application to save even more power, reducing power consumption to approximately 70% of total power.

If the main AC power has not returned by the end of a second battery period, ONT 300 moves to the Sleep State, where only active POTS calls are completed, for a sleep period of time of, for example, 20 hours. This state reduces the power consumption of ONT 300 to the absolute minimum, approximately 5% of total power in this example, so as to maximize the operational life of ONT 300.

The data access and CATV (with RF-Adaptor) applications remain turned off. The optical link to the OLT is turned off. The POTS application goes into a mode where only PLD 228A monitors the local loops for an off-hook. Regardless of the previous state, ONT 300 reports to OLT 202 that it is transitioning into the Sleep Mode Operation State by sending the "I am going to sleep" message.

When any of the POTS ports recognizes an off-hook transition while ONT 300 is in the sleep state, ONT 300 enters the Wake Up State where it fully enables all of the POTS circuits and reestablishes communication with OLT 202. ONT 300 can stay in this state for the length of the POTS call plus 15 minutes.

Thus, one of the advantages of the present invention is that PLD 228A and the Sleep Mode Operation State 322 can provide up to 20 hours of operation, assuming 14 three-minute phone calls during that time. (Each three-minute phone call causes ONT 300 to spend 18 minutes in the Wake-Up Mode State 324.) As a result, the present invention provides substantially more lifeline service than is conventionally available when 14 3-minute calls are made over a 20 hour period.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An optical network terminal (ONT) to transmsit a video signal, a data signal, and a voice signal to a subscriber when power from an external power source is present, the ONT comprising:
   a sleep logic circuit; and
   a processor connected to the sleep logic circuit to detect a loss of power from the external power source, stop a transmission of all video signals after detecting the loss of power from the external power source, stop a transmission of all data signals a predetermined period of time after stopping the transmission of all video signals, and command the sleep logic circuit to place the processor in a sleep mode a predefined time after stopping the transmission of all data signals.

2. The ONT of claim 1 further comprising a battery power circuit to detect a loss of power from the external power source, and provide power to the sleep logic circuit and the processor when power from the external power source is no longer available and the battery power circuit has power available.

3. The ONT of claim 1 wherein the processor resumes transmitting the video signal when the external power source again turns on.

4. The ONT of claim 1 wherein the processor resumes transmitting the video signal and the data signal when the external power source again turns on.

5. The ONT of claim 1 wherein the predetermined period of time and the predefined time are measured by the processor.

6. The ONT of claim 1 wherein the sleep logic circuit removes power supplied by a battery power circuit from the processor to place the processor in the sleep mode.

7. The ONT of claim 6 wherein when the processor is in the sleep mode, and a power status indicator indicates that the battery power circuit has a low power state,
   the sleep logic circuit restores power from the battery power circuit to the processor; and
   the processor transmits a signal to the optical line terminal reporting the low power state, and returns to the sleep mode.

8. The ONT of claim 1 wherein the processor enters the sleep mode of operation only after exchanging a handshake sequence of signals with the sleep logic circuit.

9. The ONT of claim 8 and further comprising a subscriber line interface circuit (SLIC), the sleep logic circuit removing a voltage from the SLIC to reduce power consumption during the sleep mode.

10. An optical network terminal (ONT) to transmit a video signal, a data signal, and a voice signal to a subscriber when power from an external power source is present, the ONT comprising:
   a sleep logic circuit;
   a processor connected to the sleep logic circuit to detect a loss of power from the external power source, stop a transmission of all video signals after detecting the loss of power from the external power source, stop a transmission of all data signals a predetermined period of time after stopping the transmission of all video signals, and command the sleep logic circuit to place the processor in a sleep mode a predefined time after stopping the transmission of all data signals; and
   a plurality of signal traces, coupled to the sleep logic circuit and the processor, connecting a high impedance to all of the signal traces when the processor is in the sleep mode.

11. An optical network terminal (ONT) that receives a video signal, a data signal, and a voice signal from an optical line terminal and transmits the video signal, the data signal, and the voice signal to a subscriber when power from an external power source is present, the ONT comprising:
   a sleep logic circuit;
   a battery power circuit to output battery power and a power status indicator that indicates a low battery power state;
   a processor connected to the sleep logic circuit to transmit a signal to the optical line terminal reporting the low battery power state when power from the external power source is present and the power status indicator indicates that the battery power circuit has the low battery power state, detect a loss of power from the external power source, stop a transmission of all video sianals after detecting the loss of power from the external power source, stop a transmission of all data signals a predetermined period of time after stopping the transmission of all video signals, and command the sleep logic circuit to place the processor in a sleep mode a predefined time after stopping the transmission of all data signals.

12. The ONT of claim 11 wherein when power from the external power source is gone, the processor is in the predetermined period of time or the predefined time, and the power status indicator indicates that the battery power circuit has a low power state, the processor transmits a signal to the optical line terminal reporting the low battery power state.

13. An optical network terminal (ONT) to transmit a video signal, a data signal, and a voice signal to a subscriber when power from an external power source is present, the ONT comprising:
- a sleep logic circuit;
- a processor connected to the sleep logic circuit to detect a loss of power from the external power source, stop a transmission of all video signals after detecting the loss of power from the external power source, stop a transmission of all data signals a predetermined period of time after stopping the transmission of all video signals, and command the sleep logic circuit to place the processor in a sleep mode a predefined time after stopping the transmission of all data signals; and
- a non-volatile memory, the non-volatile memory storing an indication of whether the processor powers up from an off mode or the sleep mode.

14. The ONT of claim 13 wherein:
the processor detects off hook transitions when the external power source provides power, during the predetermined period of time, and during the predefined time; and
the sleep logic circuit detects off hook transitions when the processor is in the sleep mode, the sleep logic circuit restoring power from a battery power source to the processor when the sleep logic circuit detects an off hook transition.

15. The ONT of claim 14 wherein when an off hook transition is detected and the non-volatile memory indicates that the processor powers up from the sleep mode, the processor returns to the sleep mode a wake up time later if power from the external power supply remains lost.

16. The ONT of claim 15 wherein the wake up time is a duration of a telephone call plus a period of time measured by the processor.

17. The ONT of claim 15 wherein:
the processor detects a replaced battery when the external power source provides power, during the predetermined period of time, and during the predefined time; and
the sleep logic circuit detects a replaced battery when the processor is in the sleep mode, the sleep logic circuit restoring power from the battery power source to the processor when the sleep logic circuit detects a replaced battery, the processor returning to the sleep mode a short time after detecting a replaced battery if power from the external power supply remains lost, the short time being substantially less than the wake up time.

18. The ONT of claim 17 and further comprising a subscriber line audio-processing circuit (SLAC), wherein the processor stops outputting a first TDM clock signal and a first frame synch signal to the SLAC, and commands the sleep logic circuit to output a second TDM clock signal and a second frame synch signal before entering the sleep mode, the second TDM clock signal having a lower frequency than the first TDM clock signal such that the processor reduces a clock rate to the SLAC before entering the sleep mode of operation.

19. The ONT of claim 18 wherein the processor places the SLIC in a standby state that consumes less power than a normal state before entering the sleep mode.

20. The ONT of claim 13 wherein when power is applied to the processor, the processor executes a first initialization sequence when the non-volatile memory indicates a transition from the off mode, and a second initialization sequence when the non-volatile memory indicates a transition from the sleep mode, the second initialization sequence being shorter than the first initialization sequence.

21. The ONT of claim 20 wherein the second initialization sequence enters a range state where the processor can respond to a ranging message from the optical line terminal in less time than the first initialization sequence.

22. The ONT of claim 21 wherein the processor outputs a subscriber message to a subscriber during the second initialization sequence, a subscriber telephone converting the subscriber message into a sound.

23. The ONT of claim 22 wherein the subscriber message includes a voice message and a comfort sound, the comfort sound giving the subscriber an illusion of an active line and providing a background when the subscriber message is output.

24. The ONT of claim 23 wherein the voice message is periodically repeated while the processor is waiting to receive the ranging message.

25. The ONT of claim 22 wherein the subscriber message is output while the processor is waiting to receive the ranging message.

26. The ONT of claim 13 wherein:
the processor outputs a first TDM clock signal and a first frame synch signal when the external power source provides power, during the predetermined period of time, and during the predefined time; and
the sleep logic circuit outputs a second TDM clock signal and a second frame synch signal when the processor is in the sleep mode.

27. The ONT of claim 26 wherein the sleep logic circuit outputs the second TDM clock signal without generating a glitch, and the second frame synch signal without generating a glitch.

28. A method of extending an amount of time that battery power is available to an optical network terminal (ONT) that receives a video signal, a data signal, and a voice signal from an optical line terminal and transmits the video signal, the data signal, and the voice signal to a subscriber when power from a first power source is present, the ONT consuming a first amount of power when the video signal, the data signal, and the voice signal, are simultaneously transmitted, the method comprising:
- continuously monitoring the first power source, and checking a power status indicator from a second power source;
- detecting a loss of power from the first power source, the second power source providing power when the loss of power from the first power source is detected;
- stopping a transmission of the video signal when the first power source is detected as lost, the ONT consuming a second amount of power when simultaneously transmitting the data signal and the voice signal, and the video signal is turned off, the second amount of power being less than the first amount of power;
- stopping a transmission of the data signal after the first power source has been detected as lost for a first predetermined period of time, the ONT consuming a third amount of power when transmitting only the voice signal, the third amount of power being less than the second amount of power;

detecting off hook transitions when power from the first power source is present, and during the first predetermined period of time; and detecting only off hook transitions while consuming a fourth amount of power after the second predetermined period of time has expired, the fourth amount of power being substantially less than the third amount of power.

29. The method of claim 28 wherein the first predetermined period of time is substantially zero minutes.

30. An optical network terminal (ONT) that receives a video signal, a data signal, and a voice signal from an optical line terminal and transmits the video signal, the data signal, and the voice signal to a subscriber, the ONT consuming a first amount of power when the ONT simultaneously transmits the video signal, the data signal, and the voice signal to the subscriber, the ONT comprising:

a sleep logic circuit; and a processor connected to the sleep logic circuit to detect a loss of power from the external power source, stop a transmission of all video signals and data signals after detecting the loss of power from the external power source, stop a transmission of all data signals a predetermined period of time after stopping the transmission of all video signals, and command the sleep logic circuit to place the processor in a sleep mode a predefined time after stopping the transmission of all data signals.

31. The ONT of claim 30 wherein the sleep logic circuit removes all power supplied by a battery power circuit from the processor to place the processor in the sleep mode.

32. A subscriber interface terminal comprising:

a processor having a normal mode, a battery mode, and a sleep mode of operation, the processor to continuously monitor a condition of an external power source, detect a loss of power condition of the external power source, and switch from the normal mode to the battery mode and stop a transmission of a video signal after detecting the loss of power condition of the external power source; and a sleep logic circuit connected to the processor, the processor to command the sleep logic circuit to place the processor in the sleep mode a predetermined period of time after the loss of power condition was detected.

33. The subscriber interface terminal of claim 32 wherein the sleep logic circuit removes all battery power from the processor to place the processor in the sleep mode.

34. The subscriber interface terminal of claim 33 wherein:

the processor detects off hook transitions when the processor is in the normal mode and the battery mode; and the sleep logic circuit detects off hook transitions when the processor is in the sleep mode, the processor detecting no off hook transitions when the processor is in the sleep mode, the sleep logic circuit restoring battery power to the processor when the sleep logic circuit detects an off hook transition.

35. The subscriber interface terminal of claim 34 and further comprising a non-volatile memory, the non-volatile memory to store an indication of whether the processor is receiving external power or restored battery power.

36. The subscriber interface terminal of claim 35 wherein when an off hook transition is detected and the non-volatile memory indicates that the processor is receiving restored battery power, the processor returns to the sleep mode a wake up time later if power from the external power source remains absent.

37. The subscriber interface terminal of claim 35 wherein when power is applied to the processor, the processor executes a first initialization sequence when the non-volatile memory indicates a transition from the off mode, and a second initialization sequence when the non-volatile memory indicates a transition from the sleep mode, the second initialization sequence being shorter than the first initialization sequence.

38. The subscriber interface terminal of claim 34 wherein:

the processor outputs a first TDM clock signal and a first frame synch signal when the processor is in the normal mode and the battery mode; and the sleep logic circuit outputs a second TDM clock signal and a second frame synch signal when the processor is in the sleep mode, the processor outputting no first TDM clock signal and no first frame synch signal when the processor is in the sleep mode.

39. A method of extending an amount of time that battery power is available to an optical network terminal (ONT) that transmits a video signal, a data signal, and a voice signal to a subscriber when power from a first power source is present, the method comprising:

detecting a loss of power from the external power source;

stopping a transmission of all video signals after detecting the loss of power from the external power source;

stopping a transmission of all data signals a predetermined period of time after stopping the transmission of all video signals; and commanding the sleep logic circuit to place the processor in a sleep mode a predefined time after stopping the transmission of all data signals.

40. The method of claim 39 and further comprising removing power supplied by a battery power circuit from the processor to place the processor in the sleep mode.

41. The method of claim 39 and further comprising non-volatilly storing an indication of whether the processor has been placed in the sleep mode.

* * * * *

UNITED STATES PATENT AND TRADEMARK OFFICE
CERTIFICATE OF CORRECTION

PATENT NO.        : 7,287,175 B2
APPLICATION NO. : 10/894770
DATED             : October 23, 2007
INVENTOR(S)       : Vereen et al.

It is certified that error appears in the above-identified patent and that said Letters Patent is hereby corrected as shown below:

Column 13, In TABLE 1

Line 61, Column 3, of the table, delete "5 mm" and replace with --5 min--.

Column 14, In Table 1-continued

Line 30, Column 2, of the table, after "disabled." insert --POTS & optics enabled--.

Column 15,

Line 48, delete "transmsit" and replace with --transmit--.

Column 16,

Line 64, delete "sianals" and replace with --signals--.

Signed and Sealed this

Eighteenth Day of December, 2007

JON W. DUDAS
*Director of the United States Patent and Trademark Office*